April 18, 1961     A. GUALTIERI     2,979,943
TRANSMISSION GEARING INCLUDING MEANS FOR MEASURING TORQUE
Filed March 11, 1958
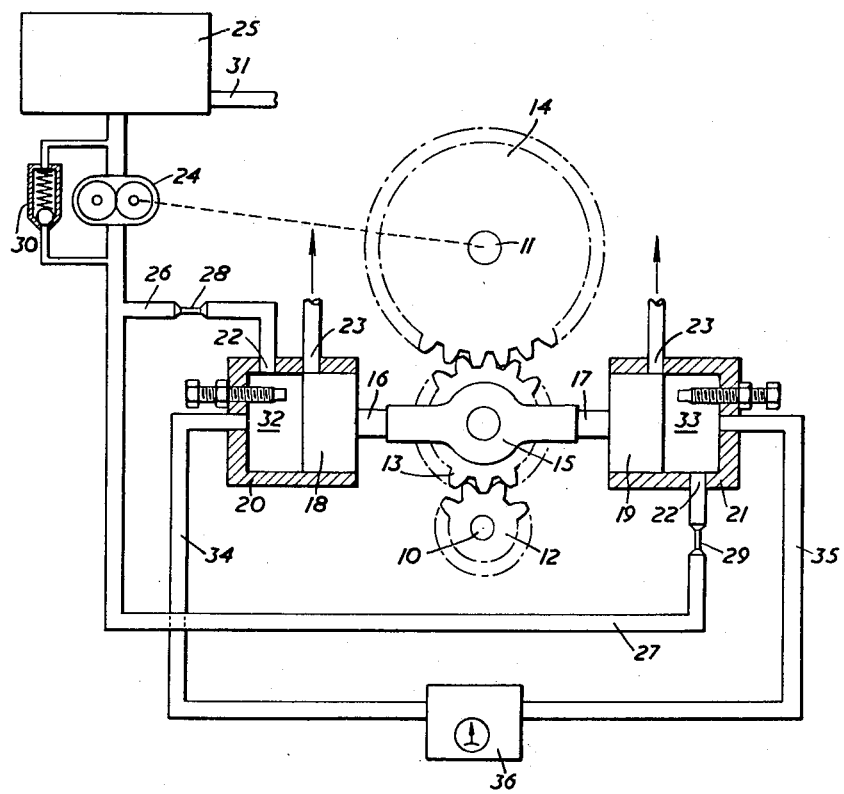
INVENTOR
ANGELO GUALTIERI
BY
ATTORNEYS

United States Patent Office 2,979,943
Patented Apr. 18, 1961

2,979,943

TRANSMISSION GEARING INCLUDING MEANS FOR MEASURING TORQUE

Angelo Gualtieri, Washington, D.C., assignor to D. Napier & Son Limited, London, England, a British company Filed Mar. 11, 1958, Ser. No. 720,662

Claims priority, application Great Britain Mar. 15, 1957

1 Claim. (Cl. 73—136)

This invention relates to transmission gearing including a torque meter for measuring the torque transmitted through the gearing.

One of the normal methods of measuring torque transmitted through a gearing has been to provide a differential gear train such as an epicyclic gear, and to measure the reaction load on the reaction member of the gear. Such systems are efficient for high values of transmitted torque but are complex and expensive to manufacture and are of considerable bulk and weight, which is a disadvantage for example in transmission gearing for use in aircraft.

It is an object of the invention to provide transmission gearing including a torque meter which will be simple and economical to manufacture and will be light and compact.

According to the invention transmission gearing including means for measuring the torque transmitted comprises an intermediate idler gear unit through which the torque is transmitted and which is mounted to be capable of limited bodily movement in a direction normal to its rotary axis under the reactions between this gear unit and the gears with which it meshes, and including means for measuring the reaction load on the axis of the gear in the direction of movement of its axis.

The idler gear unit may comprise a single pinion, or a pair of pinions of different pitch diameters mounted for rotation together on the same shaft. Conceivably the idler gear may be a bevel pinion, though normal spur gearing is preferred.

Preferably the idler gear unit and the gear with which it meshes are arranged in line with their three axes approximately in the same plane and the idler gear axis lying between the other two axes, and the bodily movement of the idler gear unit is perpendicular to this plane.

The load measuring means conveniently comprises a hydraulic piston and cylinder, one of which is connected to the idler gear unit to move bodily therewith, while the other is relatively fixed, and means for measuring the pressure developed in the hydraulic cylinder.

In such case the apparatus will preferably include means for supplying hydraulic fluid continuously to the cylinder at a pressure greater than that which will occur therein due to the reaction load and means for automatically controlling the flow of liquid to or from the cylinder in response to the bodily movement of the idler gear unit.

In a preferred construction the idler gear unit is supported in a bearing carried by a yoke piece having extensions on either side of the axis of the gear unit, each extension being connected to a hydraulic piston, which two pistons lie in hydraulic cylinders aligned with the direction of bodily movement of the gear unit.

The invention may be performed in various different ways but one specific embodiment will now be described by way of example with reference to the accompanying somewhat diagrammatic drawing.

In this example the transmission gearing is intended to act as a reduction gear between the shaft 10 of a turbine (not illustrated) forming part of a combustion gas turbine engine and an output shaft 11 connected to a power absorber driven thereby such as a propeller or auxiliary compressor. The gearing comprises a relatively small diameter input pinion 12 mounted on the turbine shaft, a slightly larger diameter idler gear 13 meshing with this input pinion, and a larger diameter output pinion 14 meshing with the idler gear 13. The three gears are of the plain spur gear type and are arranged in line, that is to say with their axes in a common plane and parallel to one another and with the axis of the idler gear lying between the axis of the input and output pinions, the axes of the input and output pinions being fixed in the gear casing.

The idler gear 13 is mounted to be capable of at least limited bodily movement in a direction perpendicular to this common plane containing the three axes. To this end the idler gear is mounted in bearings in a yoke piece 15 having extensions 16, 17 lying diametrically on opposite sides of the axis of the idler gear and the ends of these extensions are connected to hydraulic pistons 18, 19 lying in hydraulic cylinders 20, 21 aligned with the direction of bodily movement of the idler gear. The yoke piece 15 and hence the idler gear, is thus supported to be capable of movement perpendicular to the common plane containing the axes, but is restrained against any movement along this plane.

Each of the hydraulic pistons co-operates with an inlet port 22 and an outlet port 23 in the wall of the respective hydraulic cylinder to act as an automatic control valve controlling the supply and escape of hydraulic liquid to and from the chamber enclosed between the piston and the cylinder on the side of the piston remote from the axis of the idler gear. Means are provided for supplying hydraulic fluid to the inlet ports under a pressure greater than that which will normally be required to resist the reaction load on the idler gear. Thus a gear pump 24 driven from the shaft 11 is arranged to receive hydraulic liquid from a tank 25 and to deliver it under pressure through conduits 26, 27, containing restricted orifices 28, 29 to the ports 22. The hydraulic circuit includes a pressure relief valve 30 between the input and output sides of the pump to maintain the liquid delivery pressure substantially constant. The outlet port 23 of each cylinder is connected to relief, or may be connected to a return line 31 leading back to the tank 25. The pressure chambers 32, 33 at the outer ends of the two cylinders are connected by hydraulic pressure lines 34, 35 to a differential pressure meter 36 which thus provides a measure of the reaction load on the idler gear unit and hence a measure of the torque transmitted through the gearing. The meter will thus be capable of indicating the torque transmitted in either direction through the gearing.

In operation as the torque transmitted through the gearing rises the idler gear 13 will tend to move bodily under the reaction loads on its teeth (which will both be in the same direction) and this movement will be imparted to the yoke piece 15 and hence to the two hydraulic pistons 18, 19. One of these pistons (say 18) will move so that it uncovers the associated outlet port 23 and the pressure in the pressure chamber 32 formed by this piston will therefore fall. The other piston 19 will move so as to close its outlet port 23 thereby increasing the fluid pressure in the pressure chamber 33. The pistons will automatically adjust themselves until the differential fluid pressure acting thereon is sufficient just to counterbalance the reaction load on the gearing. This pressure will be indicated by the pressure meter 36, and by suitable calibration a direct reading of the torque transmitted can be obtained.

It will be appreciated that as the idler gear 13 moves bodily under the changing torque reaction its effective distance from the axes of the input and ouput pinions will vary. In practice however the bodily movement will be very small, and the variation in the distance between centres even smaller, and it has been found that small variations in the distances between the axes of each pair of meshing pinions does not affect the satisfactory operation of the gearing if involute teeth are used, nor of course does it affect the ratio of the gearing.

What I claim as my invention and desire to secure by Letters Patent is:

Transmission gearing including means for measuring the torque transmitted, comprising an intermediate idler gear unit through which the torque is transmitted, in which the idler gear unit and the gears with which it meshes are arranged in line with their three axes approximately in the same plane and the idler gear axis lying between the other two axes, and in which the idler gear unit is mounted to be capable of limited bodily movement perpendicular to this plane throughout its range of movement under the reactions between this gear unit and the gears with which it meshes, and in which the torque measuring means comprises means for measuring the reaction load on the axis of the idler gear unit, comprising a hydraulic double-acting piston and cylinder, one of which is connected to the idler gear unit to move bodily therewith while the other is relatively fixed, and means for obtaining a measure dependent upon the pressure developed in the cylinder, including means for simultaneously varying in opposite senses the pressure on the two sides of the piston in response to the bodily movement of the idler gear unit, and means for measuring the pressure difference developed between the two sides.

References Cited in the file of this patent

UNITED STATES PATENTS

| 597,567 | Robinson | Jan. 18, 1898 |

FOREIGN PATENTS

| 775,109 | France | Oct. 1, 1934 |
| 623,216 | Great Britain | May 13, 1949 |